A. Niebel.
Bee-Hive.

Nº 83532. Patented Oct. 27, 1868.

Witnesses
Harry King
Cornelius Cox

Inventor
per Abner Niebel
Alexander Mason
Attys

UNITED STATES PATENT OFFICE.

ABNER NIEBEL, OF TIFFIN, OHIO.

Letters Patent No. 83,532, dated October 27, 1868.

IMPROVEMENT IN BEE-HIVE.

The Schedule referred to in these Letters Patent and making part of the same.

*To all whom it may concern:*

Be it known that I, ABNER NIEBEL, of Tiffin, in the county of Seneca, and in the State of Ohio, have invented certain new and useful Improvements in Bee-Hives; and do hereby declare that the following is a full, clear, and exact description thereof, reference being had to the accompanying drawings, and to the letters of reference marked thereon.

The nature of my invention consists in the construction and general arrangement of a bee-hive, but more particularly in the feed-box and cap of the hive, all of which will be hereinafter more fully set forth.

In order to enable others skilled in the art to which my invention appertains to make and use the same, I will now proceed to describe its construction and operation, referring to the annexed drawings, which form a part of this specification, and in which—

Figure 1:
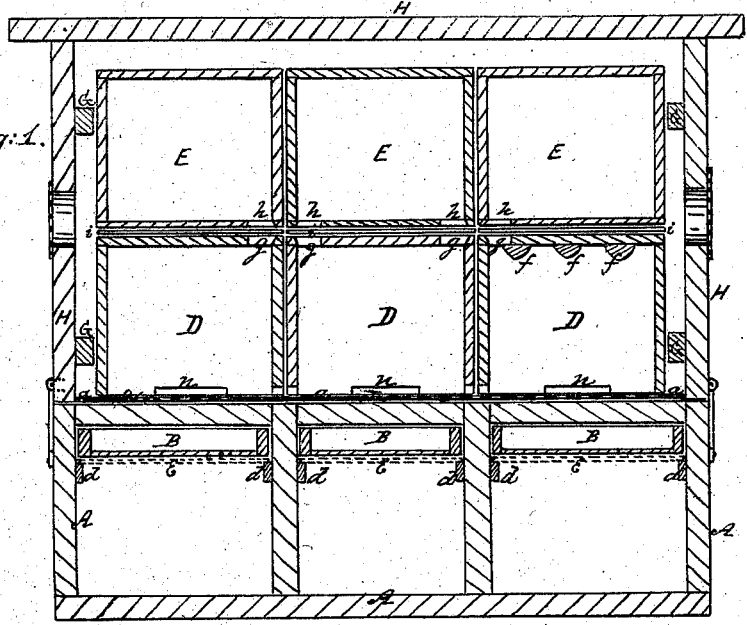

Figure 1 is a sectional rear view, and

Figure 2:
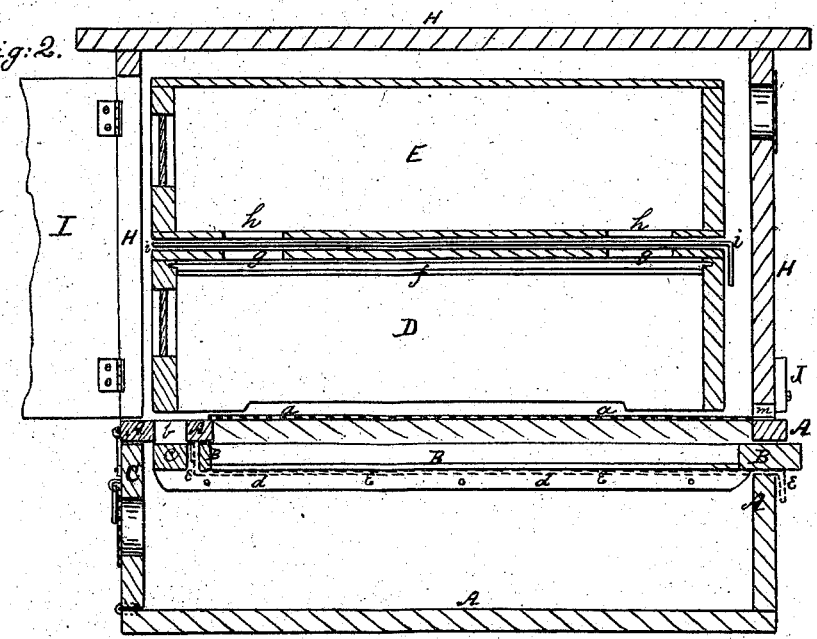

Figure 2 a sectional side view of my improved bee-hive.

A represents the lower part of the hive or feed-box, which may be made of any dimensions required, and divided into as many compartments as there are chambers or bee-boxes in the hive.

The top of the box A is open, and covered with wire cloth, $a$, which, however, does not extend the whole distance to the rear, but leaves an opening, $b$, at the rear end, for the bees to pass down into the feed-box.

These openings, one in each compartment of the box, are closed from the rear by movable blocks $c$, which slide under said openings, on the cleats or ways $d\ d$.

The ways $d\ d$ extend along the sides of each compartment in the box A, and from the front side of the box tin slides $e\ e$ are inserted on the same, which slides are bent up in their rear ends, as seen in fig. 2, and run as far back as to the opening $b$, thus completely closing the space between the wire top, $a$, and the ways $d\ d$, preventing the bees from passing out of the feed-box through the openings in front, where the slides are put in.

On top of each slide, through the same openings in the front of the box, is inserted a drawer, B, which extends as far to the rear as the slides themselves, which drawers serve to easily clean the hive, for any dirt falling on the wire top, $a$, will pass through the same, and pass into these drawers.

It will be seen that when removing the drawers B B, the slides $e\ e$ cover the space left, and prevent the bees from entering and passing out through the same.

The rear side of the box A is provided with a door, C, hinged at the bottom, and fastened at the top by hooks, as shown in fig. 2, which door serves for the purpose of putting in the feed. This door is provided with any number of holes, covered with wire cloth, for ventilation.

When it is desired that the bees shall have free access to the feed, the blocks $c\ c$ are withdrawn through the said door C, and easily put in again when so desired.

On the top of the box A, the bee-boxes or chambers D D are placed, which correspond in number, as mentioned, to the compartments in the box.

These chambers have no bottom, but the wire top, $a$, forms the bottom, as they rest thereon, and they are so placed that their rear ends extend over the openings $b\ b$ in the box, allowing the bees free passage down into the feed-box.

The sides of the chambers D are all cut out, as shown in fig. 2, except those sides which are nearest to the sides of the hive, thus enabling the bees to pass from one chamber to the other, but not pass to the outside of the same.

The chambers D D are provided, at their top, with ribs $f\ f$, running lengthwise, and fastened at the ends of the chambers. These ribs are bevelled on their lower side, and serve as comb-guides.

The front ends of the chambers are provided with glass, and the top with openings $g\ g$, which correspond with similar openings, $h\ h$, in the bottom of the honey-boxes E E, the honey-boxes being placed immediately on top of the chambers.

The communication between the chambers and their respective honey-boxes may be shut off by a tin slide, $i$, inserted from the rear between them.

The chambers and honey-boxes are all covered by a cap, H, which rests on the edges of the box A, and is provided, on the front and sides, with holes, covered with wire cloth, for ventilating-purposes. The rear side is closed by two doors, I I.

The lower edge of the front side of the cap, H, is provided with oblong openings $m$, corresponding with similar openings, $n\ n$, in the lower edge of the front end of the bee-chambers D D, as entrances for the bees. The openings $m\ m$ may be closed, when desired, by buttons J, placed on the cap, as shown.

On the sides of the cap, on the inside, are placed blocks G G, one at top, and one at bottom of each side, near the front and back, which keep the chambers and honey-boxes in proper position, and allow free circulation of air.

Having thus fully described my invention,

What I claim as new, and desire to secure by Letters Patent, is—

1. The feed-box A, constructed as described, in compartments, with wire-cloth top, door, and ventilating-holes, and provided with dirt-drawers B B, and slides $e\ e$, and with blocks $c\ c$, covering the openings $b\ b$, substantially as and for the purposes herein set forth.

2. The combination of the feed-box A, chambers D D, honey-boxes E E, and cap H, all constructed as described, and operating substantially as and for the purposes herein set forth.

In testimony that I claim the foregoing, I have hereunto set my hand, this 29th day of July, 1868.

ABNER NIEBEL.

Witnesses:
A. H. BYERS,
I. R. UMSTED.